United States Patent [19]

John

[11] 4,141,526

[45] Feb. 27, 1979

[54] INTERLOCKING JACK STAND

[75] Inventor: Julius F. John, Redondo Beach, Calif.

[73] Assignee: Norco Industries, Inc., Gardena, Calif.

[21] Appl. No.: 823,177

[22] Filed: Aug. 9, 1977

[51] Int. Cl.[2] .............................................. F16M 13/00

[52] U.S. Cl. .............................. 248/352; 254/DIG. 1

[58] Field of Search ............... 248/351, 174, 165, 188, 248/157, 529, 354 R, 354 S, 405, 352; 254/DIG. 1, 45, 11; 52/23, 126

[56] References Cited

U.S. PATENT DOCUMENTS

| | | | |
|---|---|---|---|
| 471,184 | 3/1892 | Milner | 248/405 |
| 826,162 | 7/1906 | Hedges et al. | 248/165 X |
| 958,644 | 5/1910 | Huff | 248/529 X |
| 1,472,688 | 10/1923 | Sevigny | 248/352 |
| 3,232,584 | 2/1966 | Miles | 248/352 X |
| 3,313,505 | 4/1967 | Petrie | 248/405 X |
| 3,314,655 | 4/1967 | Steele | 254/45 X |
| 3,415,490 | 12/1968 | Steele | 254/45 |
| 3,741,509 | 6/1973 | Kelly | 248/354 S X |
| 4,021,012 | 5/1977 | Miller | 248/352 |

*Primary Examiner*—J. Franklin Foss

[57] ABSTRACT

An interlocking jack stand has right and left sides of complementary configuration, each supplying two legs of a four-legged stand. Each side is a sheet bent at a right angle with legs tapered in breadth so as to be wide at the bottom and narrow at the top. Legs of one side have slots extending up from the bottom and legs of the other side have slots extending down from the top. The slots are spaced from the corner so that when the sides are slid together in interlocked relation there is a hollow central column in which a vertical adjustable screw support is mounted.

5 Claims, 13 Drawing Figures

INTERLOCKING JACK STAND

As a matter of established practice, jack stands are used to support loads in the desired position after lifting. Further, in the common use of various types of static and/or movable heavy load equipment there is a need to stabilize the load when at rest, to prevent shifting or tipping of the load, as supplementary support.

Commercial jack stands are constructed in two basic configurations. These configurations are:

Straight column construction with the ground contact area size limited by the diameter of the base column walls, which are thereby limited in their stability to support the load.

Pyramid or cone type construction which offers greater ground contact area size in relation to load capacity than straight column stands, in order to provide greater stability in supporting loads.

A common problem in existing jack stand base construction is that they are joined through a variety of commercial practices such as welding, riveting, pinning, etc. As a consequence, these constructions do not provide uniform strength of materials in the base unit under load stress. In normal usage, these joinings are prone to failure, since they present the greatest variable in manufacture and the weakest points in construction.

The invention eliminates such joining and provides uniform strength of material throughout the entire base construction to prevent such failure. Further, the invention specifically prevents dropping of the load due to joining failure which is immediate when a joint breaks. The use of uniform material results in visual distortion of the material if overloaded beyond its rated capacity, forewarning the user of overload and possible collapse.

Jack stands customarily use an extendable central shaft to contact the load. However, load stress in straight column base construction is the critical factor which limits bottom ground contact area size and base column diameter because of the strength needed at the juncture of the vertical and horizontal planes. In pyramid or cone type construction the base central column does not contact the surface on which the stand sits and load stress is distributed instead to the joined or extended support members.

Among the objects of the invention is to provide a jack stand which provides greatest strength of materials and improved stability in its top to bottom central column base configuration than is now provided by other constructions, and by virtue of which the extendable shaft rests on the central base column which is in equal contact on the same surface as the extended support members to provide broader base area than straight column stands for stability and more uniform distribution of stress under load than either straight, pyramid or cone type stands.

Another object of the invention is to provide a jack stand construction of improved strength and stability, while reducing the cost of construction through the elimination of the need to permanently assemble and join the structure.

Another object of the invention is to provide a new and improved jack stand construction which requires less storage space when not in use than other configurations.

Further among the objects of the invention is to provide a new and improved interlocking stabilizer jack stand for stabilizing the position of roadable vehicles when parked which is simple but rugged in construction and which is both easily assembled when ready to be put to use, and also readily disassembled into a compact form for packing when not in use.

Another object of the invention is to provide a new and improved interlocking jack stand which is of such design that it can be built of relatively light sheet metal, but in such form that there is provided a rugged vertical columnar effect, capable of supporting a substantial load, and which at the same time is braced against tilting movement.

Still another object of the invention is to provide a new and improved interlocking jack stand which can be quickly assembled and disassembled, and which in assembled form is equipped with a simple, easily adjustable shoe, so as to readily extend or retract the apparent vertical height of the jack stand to accommodate vehicles carried at different distances from the ground.

Still further among the objects of the invention is to provide a new and improved portable jack stand which is readily assembled and disassembled, and which consists of relatively few parts of such configuration and interlocking capability that they can be assembled together in finished workable condition merely by sliding one of the parts endwise with respect to the other, and easily and readily disassembled by merely reversing the operation.

Still further among the objects of the invention is to provide a new and improved interlocking jack stand where the interlocking relationship between adjacent edges of complementary side units not only interlocks the side units in a supporting relationship, but also provides an interlock such that portions of the side units themselves are converted to a reinforced central column acting in a vertical direction and capable of supporting relatively heavy loads, while at the same time being of relatively lightweight construction.

With these and other objects in view, the invention consists of the construction, arrangement, and combination of the various parts of the device serving as an example only of one or more embodiments of the invention, whereby the objects contemplated are attained, as hereinafter disclosed in the specification and drawings, and pointed out in the appended claims.

Figure 1:
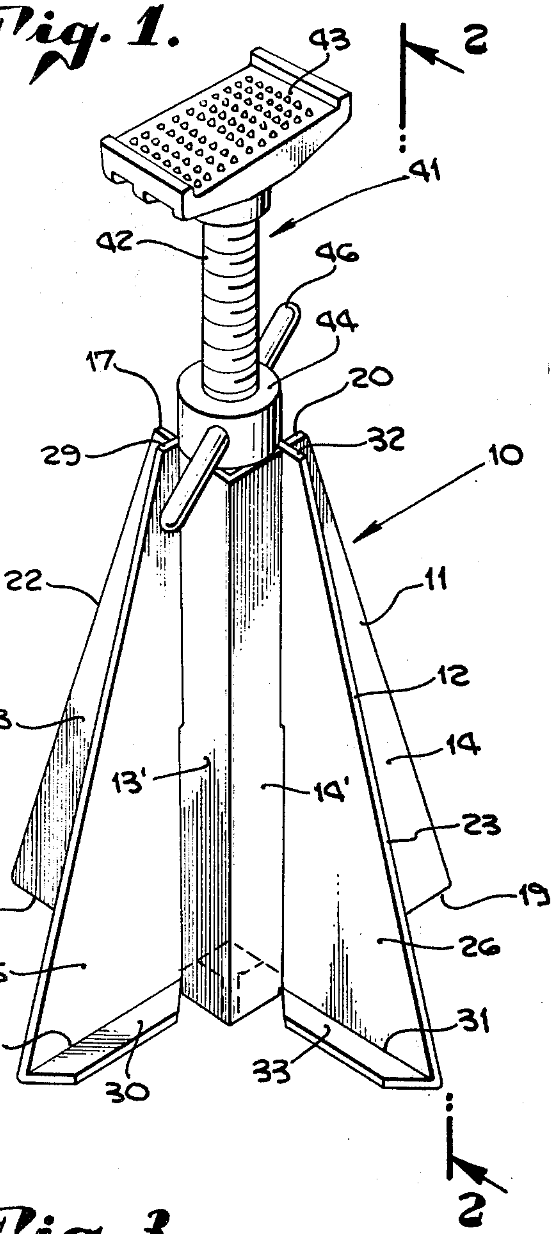
FIG. 1 is a side perspective view of one form of the device.
Figure 7:
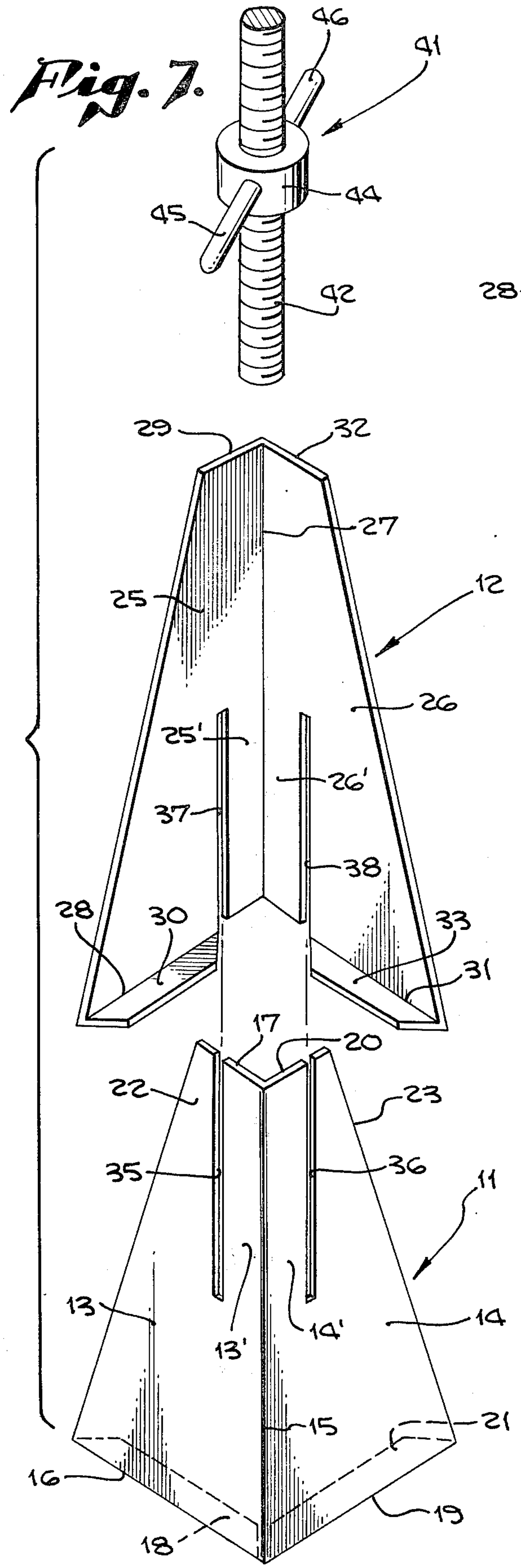
FIG. 7 is an exploded perspective view of parts of the stand.
Figure 5:
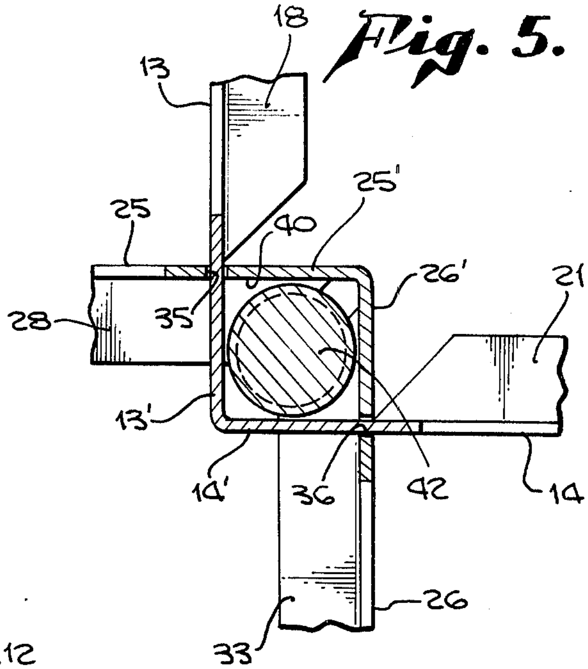
FIG. 5 is a cross-sectional view on the line 5—5 of FIG. 4.
Figure 6:
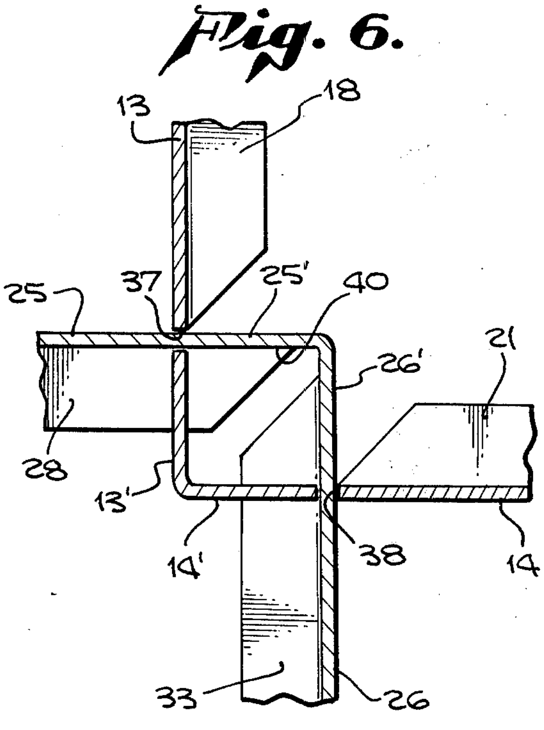
FIG. 6 is a fragmentary, cross-sectional view on the line 6—6 of FIG. 2.
Figure 11:
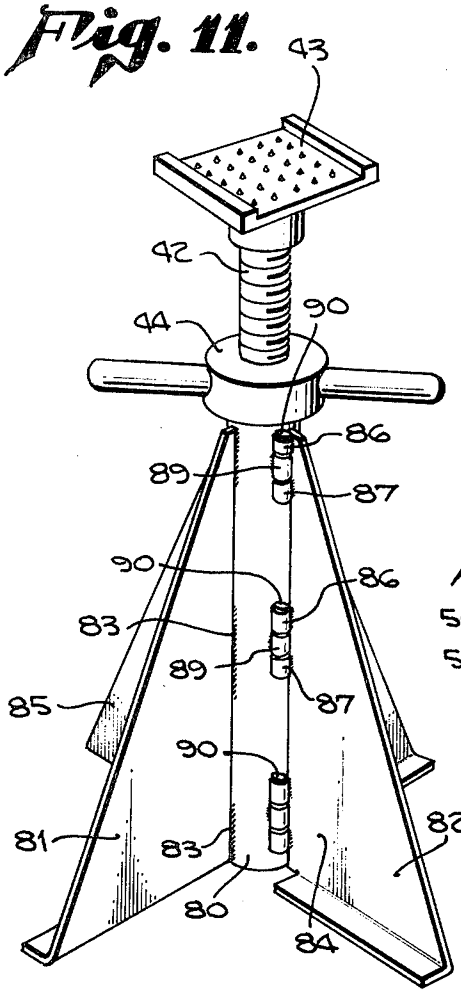
FIG. 11 is a side perspective view of still another form of the jack stand.
Figure 12:
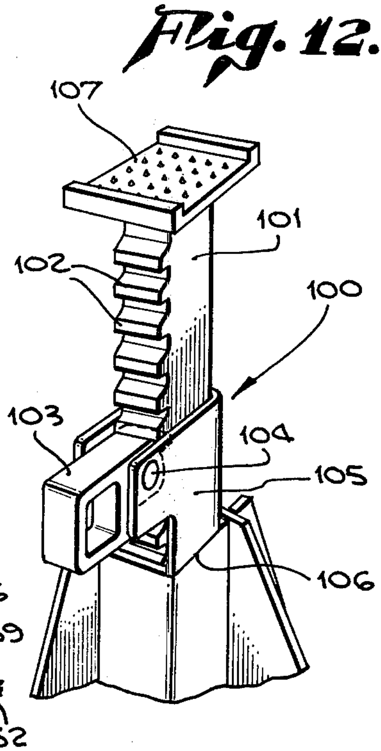
FIG. 12 is a fragmentary side perspective view of a modified adjustable shoe.

In an embodiment of the invention which has been chosen primarily by way of illustration, the interlocking jack stand of the invention indicated generally by the reference character 10, is shown as consisting in the main of two completmentary side members 11 and 12, see FIGS. 1 and 7. The side member 11 has two legs 13 and 14 of trapezoidal shape with adjacent vertical edges joined to each other at a corner 15. The leg 13 has a horizontal bottom edge 16, substantially longer than a horizontal top edge 17. At the bottom edge is an inwardly bent flange 18 to provide a relatively broad support base.

The leg 14 is similarly constructed with a bottom edge 19 and a top edge 20, there being provided a flange 21 for the bottom edge 19.

The leg 13 is provided with an oblique side edge 22 and the leg 14 with a similar oblique edge 23.

The side member 12 is of similar construction, having legs 25 and 26 with adjacent edges joined at a corner 27. The leg 25 has a bottom edge 28 and top edge 29, the bottom edge being provided with a flange 30. Similarly, the leg 26 has a bottom edge 31, a top edge 32 and a flange 33 for the bottom edge.

Extending downwardly from the top edges 17 and 21 respectively are vertical slots 35 and 36, the slot 35 being in the leg 13 and the slot 36 being in the leg 14. These slots 35 and 36 are open at the tops and closed at the bottoms. Both are spaced equidistant from the corner 15 by some appreciable amount, a distance somewhat greater than one-half the length of respective top edges 17 and 20.

The legs 25 and 26 of the side member 12 are also provided with respective slots 37 and 38. In the last instance, the slot 37 extends upwardly from the bottom edge 28 and the slot 38 upwardly from the bottom edge 31. Here again lower ends of the respective slots 37 and 38 are open and upper ends are closed.

Figure 2:
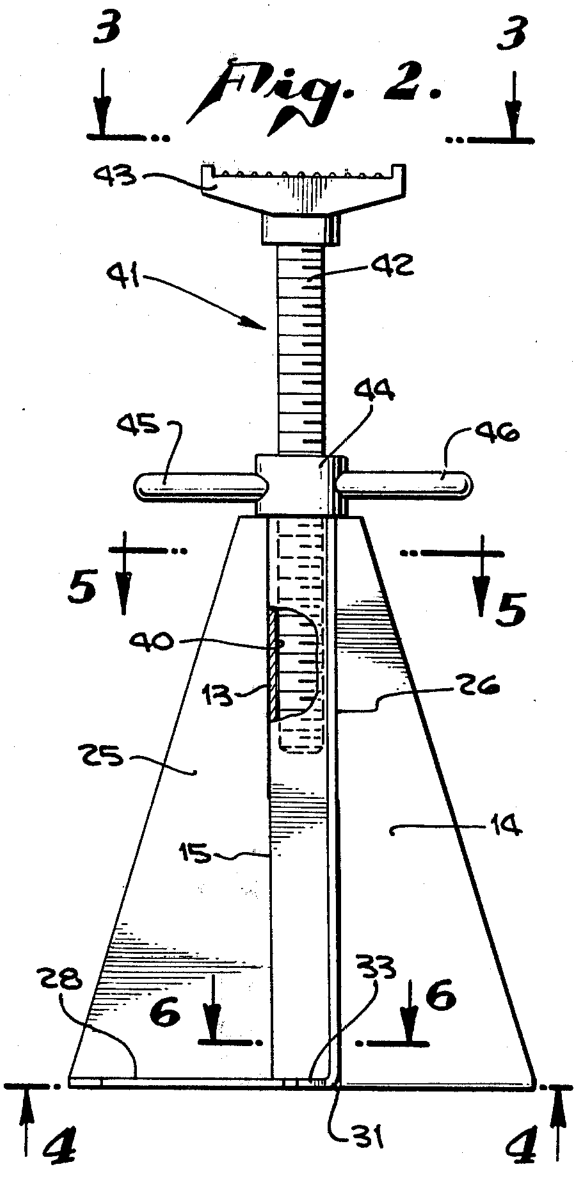
FIG. 2 is a side elevational view of the device partially broken away.
Figure 3:
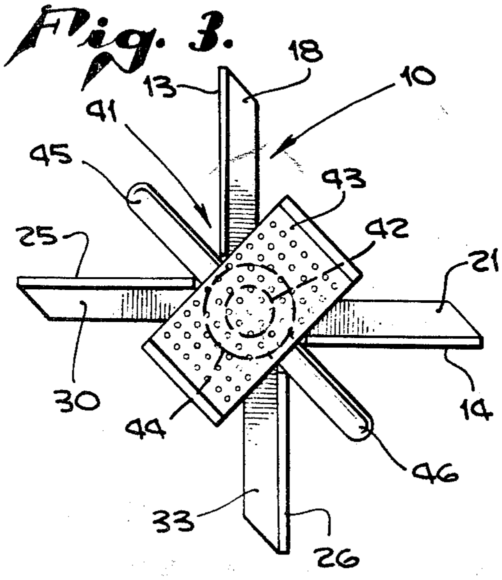
FIG. 3 is a plan view on the line 3—3 of FIG. 2.
Figure 4:
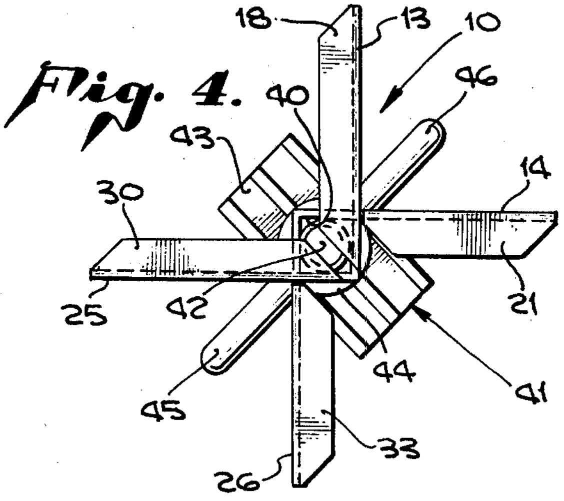
FIG. 4 is a bottom view on the line 4—4 of FIG. 3.

The two side members are adapted to be slid together into the interlock relationship shown in FIGS. 1 and 2 by aligning slots 35 and 37 on one side and slots 36 and 38 on the other side and sliding the parts together until sides of the slots 35 and 36 overlie opposite faces of respective legs 25 and 26. At the same time, opposite sides of the slots 37 and 38 will overlie opposite faces of respective legs 13 and 14.

Because of the spacing of the slots from the corners, in each instance, there is formed at the center of the assembled jack stand a hollow column which provides, in the example of FIGS. 1 through 7 inclusive, a central chamber 40 of rectangular cross-sectional shape. The sides of the column are in fact portions 13', 14' of respective legs 13 and 14 and portions 25', 26' of respective legs 25 and 26, as can be readily seen in FIGS. 5 and 6.

Adding to the serviceability of the jack stand is a support unit 41 at the top. One example of the unit, namely unit 41, consists of a vertical shaft 42 threaded throughout its length, at the top of which is a shoe 43. Intermediate opposite ends of the shaft 42 is a collar 44, internally threaded to engage the threaded shaft 42, and provided with wings 45, 46 for ease in handling. A substantial portion of the length of the shaft 42 is confined within the chamber 40 where, by reason of providing a snug sliding fit, there is lateral support for the shaft. The collar 44 can be adjusted up or down on the shaft 42, in order to change the elevation of the shoe 43 so that it will engage the underside of the vehicle (not shown) with which it is to be used.

Although a specific support unit such as the unit 41 has been shown in connection with the form of the invention of FIGS. 1 through 7 inclusive, other support units shown in successive figures of the drawing are equally adaptable.

Figure 9:
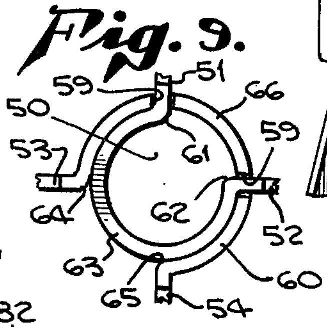
FIG. 9 is a fragmentary top view on the line 9—9 of FIG. 8.
Figure 13:
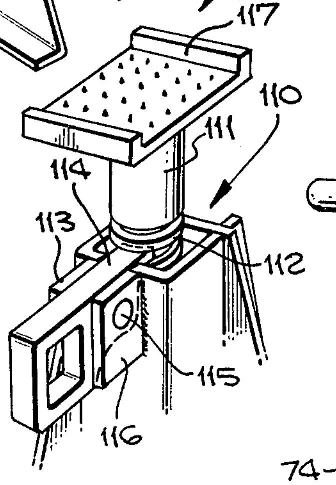
FIG. 13 is a fragmentary side perspective view of another modified adjustable shoe.
Figure 10:
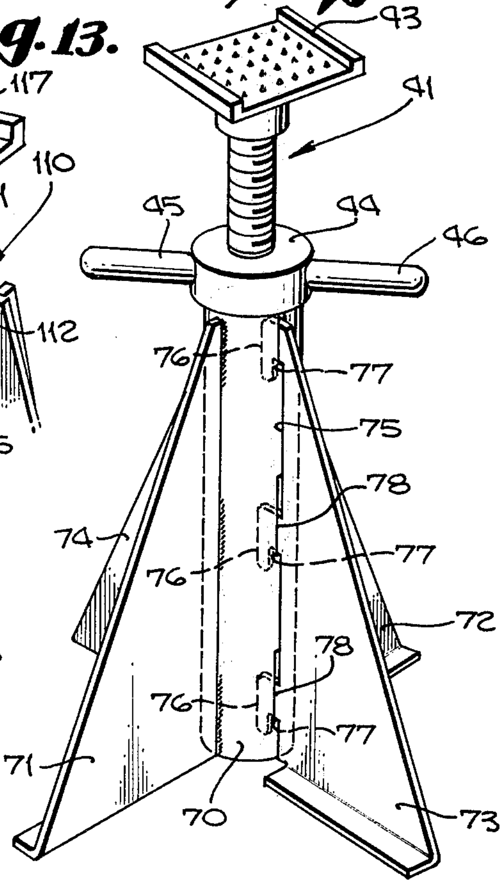
FIG. 10 is a side perspective view of a third form of the jack stand.
Figure 8:
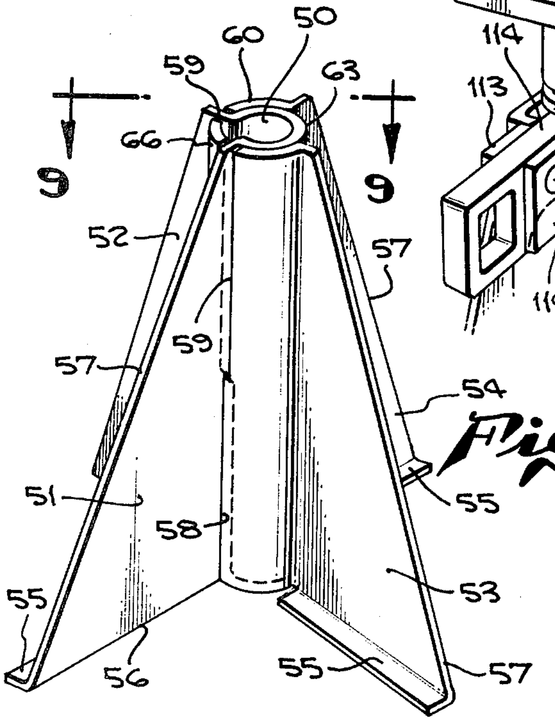
FIG. 8 is a side perspective view of another form of the jack stand.

In another embodiment of the invention, a central column is made substantially circular in cross-sectional shape forming a corresponding circularly shaped chamber 50. The jack stand featuring the chamber 50 is similar in substantial respects to the jack stand of FIGS. 1 through 7 inclusive with respect to the shape and configuration of legs 51, 52, 53 and 54. Each leg is provided with a flange 55 at the bottom edge 56 and a sloping side edge 57. In this instance, the legs 51 and 52 are provided with slots 58 which extend upwardly from the respective bottom edges 56. The other legs 53 and 54 are provided with slots 59 which extend downwardly from top edges 60, see FIGS. 8 and 9.

There is a vertical inner edge 61 for the leg 51 and a similar vertical inner edge 62 for the leg 52, the inner edges 61 and 62 being located at the corners. Intermediate the inner edges 61 and 62 is an arcuate portion 63 which forms part of the central column, defining in part the chamber 50. Somewhat similarly, the leg 53 is provided with an inner vertical corner edge 64 and the leg 54 with an inner vertical corner edge 65. Intermediate the last two identified corners edges 64 and 65, is an arcuate portion 66 which forms a substantial portion of the central column within which is the chamber 50. It is of consequence to note that for a substantial portion of the circumference of the central column which is virtually cylindrical in shape, the wall of the column has a double thickness, thereby to add materially to its rigidity, ruggedness and stability.

For another form of interlocking type jack stand, there may be provided a separate central column 70 which may be of right cylindrical shape or of a comparable geometrical shape, to which is welded legs 71 and 72. Legs 73 and 74, at their inner vertical edges 75, are provided with tabs 76, each with an undercut portion 77. Extending through the wall of the column are complementary lock slots 78 of length sufficient to receive the tabs 76 in the interlocked positions shown. When the legs 71 and 72 are opposite to each other, and the legs 73 and 74 removed from the interlocked position, the jack stand can be packed flat. It may, however, be preferable to have the welded legs in positions at right angles to each other with the remaining two legs having the tabs 76, in which event a number of jack stands in disassembled condition can be packed in a nested relationship.

In the alternative, for a central column 80, to which legs 81 and 82 may be anchored by welds 83, for example, legs 84 and 85 are equipped with hinge knuckles 86 and 87 in pairs at spaced intervals with respect to an inside vertical edge 88. The hinge knuckles 86 and 87 are adapted to cooperate with hinge knuckles 89 at correspondingly vertically spaced intervals on the central column 80. Pintels 90 pivotally secure the hinge knuckles in engagement so that legs 84 and 85 can be swung into substantially parallel engagement with one or another of the lgs 81 and 82 when jack stands so equipped are removed from supporting position and stowed for packing.

Irrespective of the manner in which the legs of the jack stand cooperate with each other in an appropriate interlocking relationship, a support unit such as the unit 41 may be employed. In the alternative, however, a unit such as the progressively adjustable support unit 100 may be used with any one of the leg constructions. For the support unit 100, there is provided a shaft 101 wherein vertically spaced teeth 102 form a rack which is adapted to cooperate with a releasable retention fixture 103. The fixture has a pivot pin 104 which pivotally secures it to a collar 105, the collar being of such size that a bottom edge 106 rests upon and is supported by the upper edge of whatever leg structure may be chosen. A shoe 107 at the top is adapted to engage the under carriage of whatever mobile unit may need to be stabilized. Clearly, from the direction of the teeth 102, the shaft 101 and shoe 107 can be lifted progressively upwardly which movement is permitted by successive tilting motions of the retention fixture 103, the action of which holds the shaft in whatever upward position may be chosen. When the shaft is to be lowered, the retention fixture can be pivoted out of the way of the teeth to permit the shaft to be lowered out of supporting position.

In another form of support unit 110 provided with a shaft 111 having helical threads 112, a retention fixture 113 is provided with a thread follower 114, normally in engagement with the threads. The retention fixture has a pivot pin 115 pivotally attaching the retention fixture 113 to a flange 116. The flange is anchored to the upper portion of whatever leg structure may be chosen by conventional means such as welding. A shoe 117 is also part of the equipment. In this form of support unit and with the retention fixture having its thread follower in engagement with the thread, the shaft 112 and shoe 117 can be rotated upwardly, to engage the vehicle, or downardly for a more precise elevational adjustment. Should the jack stand need to be removed quickly, the retention fixture 113 is adapted to be tilted so that the thread follower 114 is out of engagement with the helical thread 112, thereby to permit the shaft to lower its full distance immediately.

Having described the invention, what is claimed as new in support of Letters Patent is as follows:

1. An interlocking jack stand comprising side members providing a central hollow column, each side member comprising leg means of sheet metal of substantially uniform thickness and having a width tapering from a relatively narrow top to a relatively wide base, inside vertical edges of legs of said members having a releasable interlocked engagement with said hollow column at the perimeter of said hollow column, horizontal edges at the base of said legs being at an angle with respect to each other and forming a supporting base, horizontal edges at the tops of said legs being at a corresponding angle with respect to each other and forming an upwardly facing supporting platform, two legs for each side member comprising flat plates in right angular relationship and forming a vertical junction, there being slots in the legs of one side member extending inwardly from one end of the column and slots in the legs of the other side member extending inwardly from the opposite end of the column, the slots being spaced from the vertical junction enabling formation of a vertical chamber when the side members are interlocked, said vertical junction being a corner edge and said vertical chamber having a rectangular cross-sectional shape, said column having a height many times greater than the width of the column and greater than the width of the supporting base.

2. An interlocking jack stand as in claim 1 wherein said bottom edges of the legs have angularly bent flanges forming supporting feet for said legs, portions of said supporting feet being at a location beneath said column.

3. An interlocking jack stand comprising side members providing a central hollow column with an inwardly facing side wall structure, each side member comprising leg means of sheet metal of substantially uniform thickness and having a width tapering from a relatively narrow top to a relatively wide base, inside vertical edges of legs of said members having a releasable interlocked engagement with said hollow column at the perimeter of said hollow column, horizontal edges at the base of said legs being at an angle with respect to each other and forming a supporting base, horizontal edges at the tops of said legs being at a corresponding angle with respect to each other and forming an upwardly facing supporting platform, two legs for each side member comprising flat plates in right angular relationship and forming a vertical function, there being slots in the legs of one side member extending inwardly from one end of the column and slots in the legs of the other side member extending inwardly from the opposite end of the column, the slots being spaced from the vertical junction enabling formation of a vertical chamber when the side members are interlocked, said vertical junction being a corner edge and said vertical chamber having a rectangular cross-sectional shape, a vertical adjustable support unit having a shaft located in said hollow column in guided relationship with the inwardly facing side wall structure of the column and a substantially horizontally extending bearing surface on the shaft in bearing engagement with said supporting platform.

4. An interlocking jack stand as in claim 3 wherein there is a vertically adjustable collar on said shaft, said collar having thereon the substantially horizontal extending bearing surface in engagement with said supporting platform.

5. An interlocking jack stand as in claim 3 wherein the height of said column is at least seven times greater than the width.

* * * * *